(12) United States Patent
Fitz

(10) Patent No.: US 6,171,177 B1
(45) Date of Patent: Jan. 9, 2001

(54) APPARATUS AND METHOD FOR MIDSPAN ACCESS OF ENCAPSULATED OPTICAL FIBERS

(75) Inventor: Jonathan G. Fitz, West Columbia, SC (US)

(73) Assignee: Pirelli Cable Corporation, Lexington, SC (US)

( * ) Notice: Under 35 U.S.C. 154(b), the term of this patent shall be extended for 0 days.

(21) Appl. No.: 09/350,034

(22) Filed: Jul. 8, 1999

Related U.S. Application Data

(62) Division of application No. 09/053,289, filed on Apr. 1, 1998, now Pat. No. 6,007,413.

(51) Int. Cl.[7] ................................................. B24B 21/00
(52) U.S. Cl. ........................... 451/59; 451/313; 451/314; 451/523; 451/539
(58) Field of Search .................................. 451/523, 313, 451/316, 314, 524, 539, 552, 555, 558, 312, 344, 59

(56) References Cited

U.S. PATENT DOCUMENTS

| 3,346,897 | 10/1967 | Nelson . | |
|---|---|---|---|
| 3,851,425 | 12/1974 | Lang . | |
| 4,442,587 | 4/1984 | Shields et al. . | |
| 5,241,793 | * 9/1993 | Armato | 451/558 |
| 5,445,050 | * 8/1995 | Owens | 451/558 |
| 5,460,682 | 10/1995 | Beasley et al. | 156/344 |
| 5,460,683 | 10/1995 | Beasley, Jr. et al. . | |
| 5,569,064 | * 10/1996 | Gleadall | 451/558 |
| 5,594,966 | * 1/1997 | Goldman | 451/558 |
| 5,604,834 | 2/1997 | Beasley, Jr. et al. . | |
| 5,660,582 | * 8/1997 | Terris | 451/558 |
| 5,782,681 | * 7/1998 | Bresnahan | 451/555 |

* cited by examiner

Primary Examiner—Eileen P. Morgan
(74) Attorney, Agent, or Firm—Norris, Mc Laughlin & Marcus; L. P. Brooks

(57) ABSTRACT

Midspan access to selected optical fibers which are encapsulated in an optical ribbon or tube is achieved by placing the desired span of the encapsulated fibers to be accessed between opposing abrasive layers and controllably urging at least one of the abrasive layers in the direction of the opposing abrasive layer to cause both abrasive layers to contact the encapsulant which covers the fibers. The amount of force applied to the at least one abrasive layer is limited by the structure of a resilient element which is coupled to the abrasive surface. Stress concentrators are created in the encapsulant and the encapsulant is removed from the span portion by relative movement of the encapsulated fibers and the abrasive layers. A minimum separation distance between the opposing abrasive layers can be defined, according to the thickness of the specific encapsulated fiber medium undergoing fiber separation, to avoid contact between the abrasive surfaces and the fibers within the medium. Access to the individual fibers is provided after the stress concentrators are formed in the encapsulant or encapsulant in the desired span portion has been substantially removed.

6 Claims, 8 Drawing Sheets

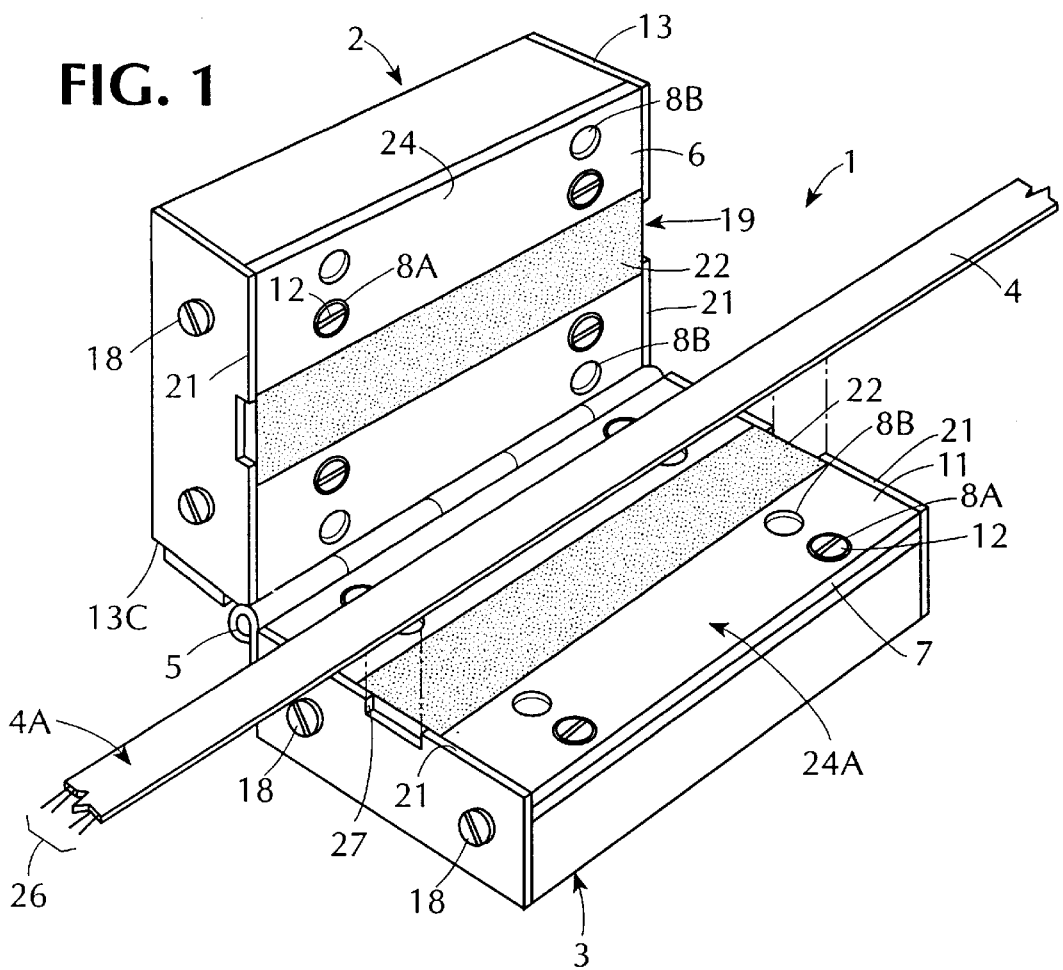

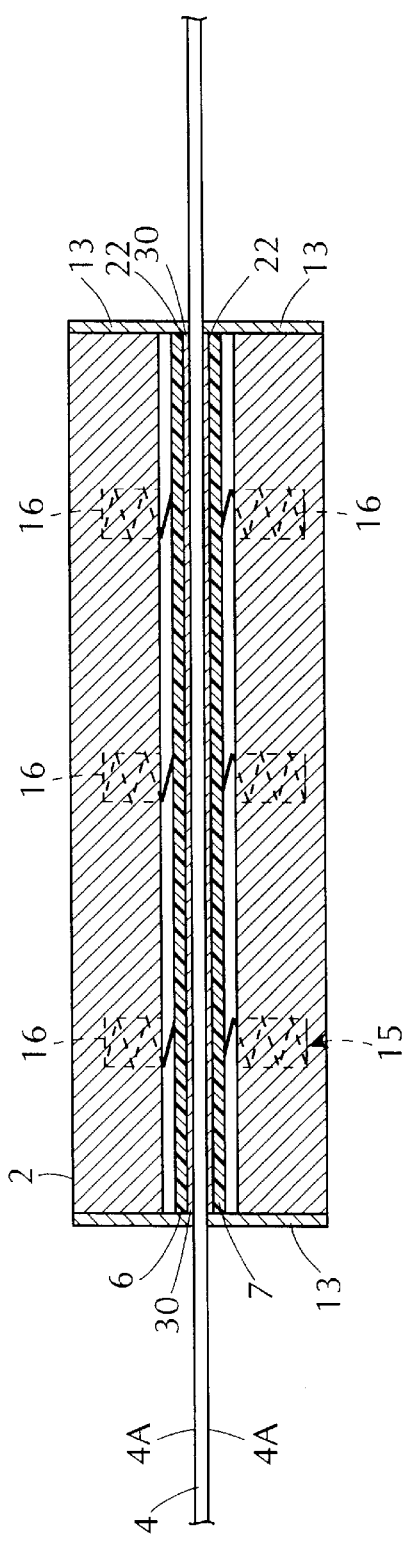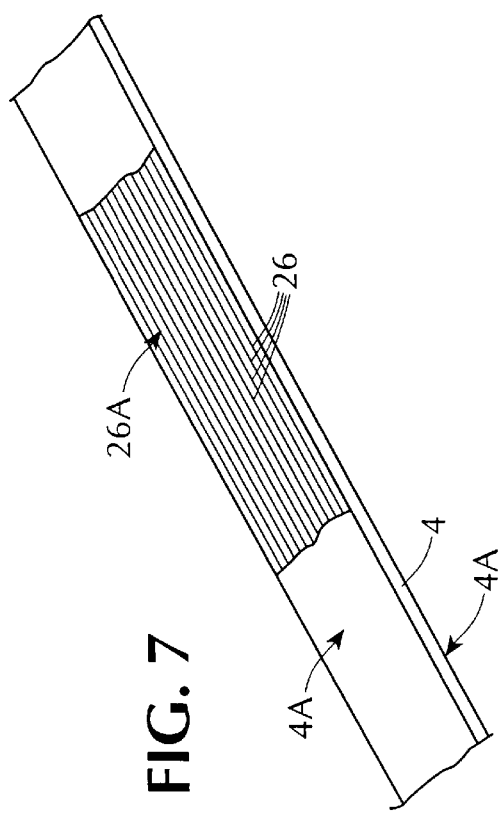

APPARATUS AND METHOD FOR MIDSPAN ACCESS OF ENCAPSULATED OPTICAL FIBERS

This is a Divisional of Ser. No. 09/053,289, now U.S. Pat. No. 6,007,413, filded Apr. 1, 1998.

FIELD OF THE INVENTION

The present invention relates to a tool and method for facilitating access to optical fibers contained in an optical fiber cable, and more particularly, for removing encapsulating material which encircles optical fibers in an optical fiber cable.

BACKGROUND

Optical fiber is now used in a variety of telecommunication applications because of its small physical size and high bandwidth capacity. Typically, multiple fibers are contained in an optical fiber ribbon or loosely enclosed in a buffer tube, and an optical fiber cable is manufactured to include several buffer tubes or ribbons. A plastic encapsulant surrounds the fibers within a ribbon or tube to protect and insulate the fibers from stress and bending.

Optical fiber cables with enclosed ribbons or tubes are conventionally manufactured and marketed in the form of reels. Oftentimes, during or after initial installation of an optical fiber cable, access to the individual fibers along the length of the fiber cable, commonly referred to as midspan access or entry, is required.

Current midspan access techniques, however, do not provide a means for easy and quick access to fibers with low risk of damage to fibers or fiber coatings. For example, cutting of the encapsulant with a knife blade or pin does not provide for easy control of the depth and position of a cut and often results in undesired cutting of an optical fiber or damage to the coatings on the fibers, which degrades the longevity or reliability of the fibers. In addition, initiating a peel of the encapsulant in the middle of a ribbon is difficult because the encapsulant is often a thin covering over the fibers and has a surface which is smooth and flat and sometimes coated with a water blocking gel.

Other midspan access techniques such as immersing a ribbon or tube in chemicals or heating for reducing the strength of the bond between the fibers and the encapsulant are extremely time consuming and can harm coatings and partially or completely alter or remove ink coloring identification on the fibers. In particular, the use of chemicals often requires post-cleanup of the fibers after access is obtained.

Beasley, William E., "Meeting the Demands of the Local Loop with Improved Ribbon Fiber Midspan Access", 1994 NFOEC Conference, pp. 401–409, incorporated by reference herein, describes a midspan access technique which requires that, after the outer covering of a cable is removed, two friction pads are placed on either side of a ribbon and forcibly moved against each other to focus the force applied to the pads on a particular span of the ribbon and weaken the bond of the encapsulant to the ribbon in that area. The removal of encapsulant by use of friction pads, however, often results in contact between the friction pads and the fibers which become exposed, thereby risking damage to the fibers or coatings on the fibers.

Therefore, there exists a need for a method and apparatus for accessing encapsulated optical fibers in midspan of an optical fiber cable which overcomes the disadvantages of the prior art techniques described above.

SUMMARY OF THE INVENTION

In accordance with the present invention, a tool for separating optical fibers which are encircled by an encapsulant and included in such optical signal transmission media as an optical fiber ribbon or buffer tube comprises a pair of holders for receiving the encapsulated optical fibers therebetween. At least one of the surfaces of the holders which face each other and receive the encapsulated optical fibers therebetween has abrasive material thereon for engaging the encapsulant. At least one of the holder surfaces is resiliently urged from within the tool in the direction of the other surface, which can be fixed in position or also can be urged toward the other surface, for causing the abrasive material to resiliently engage the encapsulated fibers and to apply a force to the encapsulant fibers that cannot exceed a predetermined maximum.

When the encapsulated fibers are held between the holders, the encapsulated fibers or the tool is moved transversely relative to the direction of the bias which is applied to the at least one holder surface to cause the abrasive material to move against and abrade a desired span portion of the encapsulated fibers. The abrasive material is of a predetermined grit insufficient to remove encapsulant completely from the fibers based on the movement of the abrasive material only once against the span portion. Movement of the abrasive material against the span portion only once will create stress concentrators in the encapsulant, and movement of the abrasive material against the same span portion more than once will cause the abrasive material to scratch off or remove encapsulant which contacts the abrasive material, as well as to create stress concentrators in the encapsulant that remains on the fibers. After only the stress concentrators are created in the encapsulant or there has been substantial removal of encapsulant, the medium can be easily removed from the tool and access to the fibers at a desired midspan portion of the medium is readily available.

In still another aspect of the invention, the tool is constructed to provide that the biasing force on the abrasive material cannot cause the separation distance between the abrasive surfaces to be less than a minimum separation distance. The minimum separation distance avoids contact between the abrasive surfaces and the fibers in the encapsulant. When the biased abrasive material at the at least one holder surface has moved toward the other holder surface such that the minimum separation distance is achieved, substantial or complete removal of the encapsulant at the span portion acted upon by the abrasive surface has occurred.

In a preferred embodiment, the tool includes first and second holders which are pivotally engaged to permit relative movement such that each opposes the other with abrasive material on each surface spaced from and facing the abrasive material on the other surface. Each of the holders includes a floating plate having an abrasive coating or a strip or pad with abrasive material on an inner surface. Shoulder screws couple a plate to its associated holder and a plate includes recesses for receiving the heads of the screws from the opposing plate. The recesses are of a sufficient depth to prevent contact between the heads of the screws on one plate and the opposing plate. A resilient spring or a resilient material such as a foam pad between a plate and its associated holder applies a bias force, which cannot exceed a predetermined maximum, to the plate in the direction of the opposing plate for resiliently holding the encapsulated optical fibers.

In another embodiment, the tool includes a first holder which is coupled to a floating plate having an abrasive coating or a strip or pad with an abrasive material on its inner surface and a second holder which is fixed in place and includes an abrasive material on its inner surface. The abrasives on the respective holders oppose each other when the holders oppose each other. Shoulder screws couple the plate to the first holder. A resilient spring between the plate and the first holder applies a bias force, which cannot exceed a predetermined maximum, to the plate in the direction of the opposing abrasive material on the second holder.

In a further embodiment, the recesses have a depth which is insufficient to prevent contact between the screw heads and the elements defining the recesses. Therefore, the screw heads and such recesses define a minimum separation distance between the abrasive materials when the tool is closed. The spring applies the bias force for resiliently holding the encapsulated optical fibers until the minimum separation distance between the plates is reached.

In still a further embodiment, the tool having at least one floating plate includes a projection on at least one of the plates which extends from the inner surface of the one plate toward the inner surface of the opposing holder or plate. The projection defines a minimum separation distance between the inner surface of the plate and the inner surface of the opposing holder or plate.

BRIEF DESCRIPTION OF THE DRAWINGS

Other objects and advantages of the present invention will be apparent from the following detailed description of the presently preferred embodiments, which description should be considered in conjunction with the accompanying drawings in which:

FIG. 1 is a perspective view of a fiber separating tool assembly of the present invention in the open position with an optical fiber bon positioned to be received therein;

FIG. 2 is a perspective view of the tool assembly of FIG. 1 in the fully engaged position with the fiber ribbon held therein;

FIG. 4 is a transverse sectional view taken along the line 4—4 of FIG. 2;

FIG. 7 shows a perspective view of the ribbon after the tool has been operated at a midspan portion of the ribbon to permit access to an individual fiber in the ribbon;

DETAILED DESCRIPTION

Figure 3:
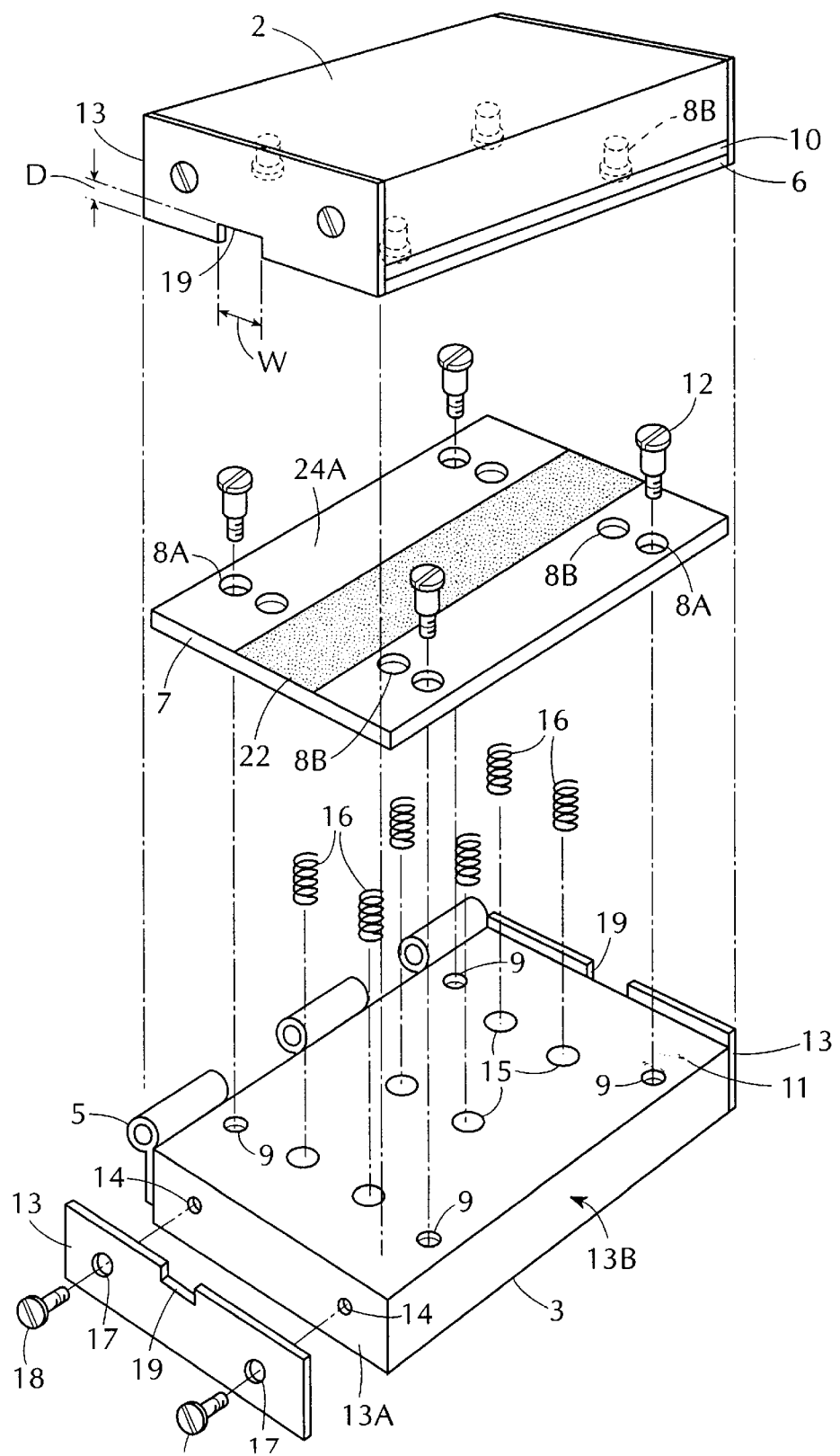
FIG. 3 is a fragmentary, exploded view of the components in the bottom portion of the tool assembly and of the spatial relation between the bottom portion and the top portion of the tool when fully engaged.

The invention will be illustrated in connection with individual fibers which are encapsulated by encapsulating material to define an optical fiber ribbon and the separation of the encapsulated fibers from the encapsulating material at a midspan location on the ribbon in accordance with the present inventive technique. It is to be understood, however, that the present inventive technique is applicable to the separation of encapsulated fibers from encapsulating material used for enclosing optical fibers in a plastic tube or buffer tube. For example, if the plastic tube is circular in cross-section and tightly encloses the fibers, or if the loose buffer tube is circular in cross-section and is sufficiently rigid, the planar abrading surfaces described hereinafter and illustrated in the drawings will abrade the encapsulant, such as to create stress concentrators in the encapsulant and to thin the tube along longitudinally extending and diametrically opposite lines, thereby permitting peeling of the encapsulant between the lines. If desired, the abrasive materials which engage the encapsulant can be shaped to conform to the shape of the encapsulant, e.g., can be semi-circular.

FIGS. 1–4, 5A and 5B illustrate a preferred embodiment of a tool 1 for separating encapsulated fibers from the encapsulant. The tool 1 includes a first holder 2 and a second holder 3, each made of a metal, such as steel or aluminum, or made of a plastic. The holders 2 and 3 are pivotally engaged with one another at a hinge 5. FIG. 1 illustrates the tool 1 in an open position, and FIGS. 2, 4, 5A and 5B illustrate the tool 1 in a fully engaged or closed position, with an optical fiber ribbon 4 held therein. The ribbon 4 includes flat longitudinal faces 4A and is formed from an encapsulant matrix 25 (see FIG. 5A) which encircles eleven fibers 26 arranged side-by-side.

Referring to FIG. 1 and FIG. 3, the latter showing an exploded view of parts of the tool 1 in the closed position, the holder 2 includes a portion in the form of a first plate 6 and the holder 3 includes a portion in the form of a second plate 7, each having substantially the same dimensions as inner surface faces 10 and 11 of the holders 2 and 3, respectively. Preferably, the plates 6 and 7 are made of a plastic, such as nylon, polytetrafluoroethylene, etc., and each include four screw receiving holes 8A which are in alignment with four tapped holes 9 in the holders 2 and 3, respectively. The holders 2 and 3 further include six blind holes 15.

Shoulder screws 12 are passed through the holes 8A in the plates 6 and 7 and threaded into the holes 9. Each of the plates 6 and 7 also includes four recesses 8B which are in alignment with the receiving holes 8A in the opposing plate when the tool 1 is in the closed position. The recesses 8B are of sufficient depth to prevent contact between the heads of the screws 12 and the plate at the bottom surfaces of the recesses 8B when the tool 1 is closed and encapsulant is removed from a ribbon.

Six coil springs 16 are received in the holes 15 in the holders 2 and 3. The springs 16 engage the plate portions of the holders and extend from the holes 15 to the plates 6 and 7 which are attached to the respective holders 2 and 3. The springs 16 are selected so as to urge the plates 6 and 7 toward each other and apply a relatively light pressure, such as, for example, 8–25 p.s.i., to the surfaces 4A of the ribbon 4.

Referring to FIGS. 1, 2 and 3, each of the holders 2 and 3 includes two tapped holes 14 at each of its end surfaces, such as the surface 13A. A pair of end plates 13, each having the same width as and a height greater than that of the end surfaces 13A of the holders 2 and 3, are rigidly connected to the ends 13A. The end plates 13 include screw receiving holes 17 which are aligned with the holes 14 in the ends 13A. Screws 18 are inserted through the holes 17 and threaded into the holes 14 in the ends 13A of the holders 2 and 3 of the tool 1 to secure the end plates 13 rigidly to the tool 1.

Each of the end plates 13 includes a cut-out 19 at the inner edge surface 21 of the end plate 13. As shown in FIG. 3, the cut-out 19 has a depth D, which is suitably equal to at least one-half of the thickness of the optical fiber containing ribbon to be operated upon by the tool 1, and a width, W, which is suitably equal to the width of a standard fiber ribbon having optical fibers in side-by-side arrangement.

Referring to FIGS. 1, 3, 4, 5A and 5B, pads or strips 22 having an abrasive on their surfaces which face the ribbon 4 and with adhering or pressure contact 23 are attached to surface portions 24 and 24A of the plates 6 and 7, respectively, and extend lengthwise between the cut outs 19 in the end plates 13. The strips 22 can extend less than the full longitudinal length of the tool 1 and have a transverse dimension which is less than the width W of the cut outs 19. Preferably, the surfaces 23 of the strips or pads 22 have an adhering or pressure contact adhesive back surface (not shown) to allow for easy removal and application of the strips or pads 22 to the plates 6 and 7.

The strips 22 are preferably made of fine grit sandpaper or other materials with an abrasive surface. The abrasive is a conventional material having, for example, a grit in the range of about 150 to 600 grit, depending on the thickness of the encapsulant 25 of the ribbon 4. In preferred embodiments, the grit is sufficiently fine that it cannot penetrate the thickness of the encapsulant measured between one of the surfaces 4A of the ribbon and the respective opposing outermost peripheral surface of the optical fibers 26. Although the grit may be so coarse as to be thicker than the measured thickness from the peripheral fiber surface to the surface 4A, the springs 16 are suitably selected so that the force applied is insufficient to cause the grit to penetrate through the encapsulant and to the fibers. Further, the accumulation of residue from the abrasive action avoids penetration of the grit through to the fibers.

Referring to FIGS. 1, 2 and 3, the pivoting hinge 5 is rigidly secured to one of side surfaces 13B and 13C of each the holders 2 and 3 of the tool 1 to permit one holder to be relatively rotated toward or away from the other to achieve an open or closed position of the tool 1. In the open position of the tool 1, as shown in FIG. 1, one of the holders is relatively rotated on the hinge 5 sufficiently away from the other holder so that the opposing edge surfaces 21 on the end plates 13 are spaced from each other.

Figure 5A:
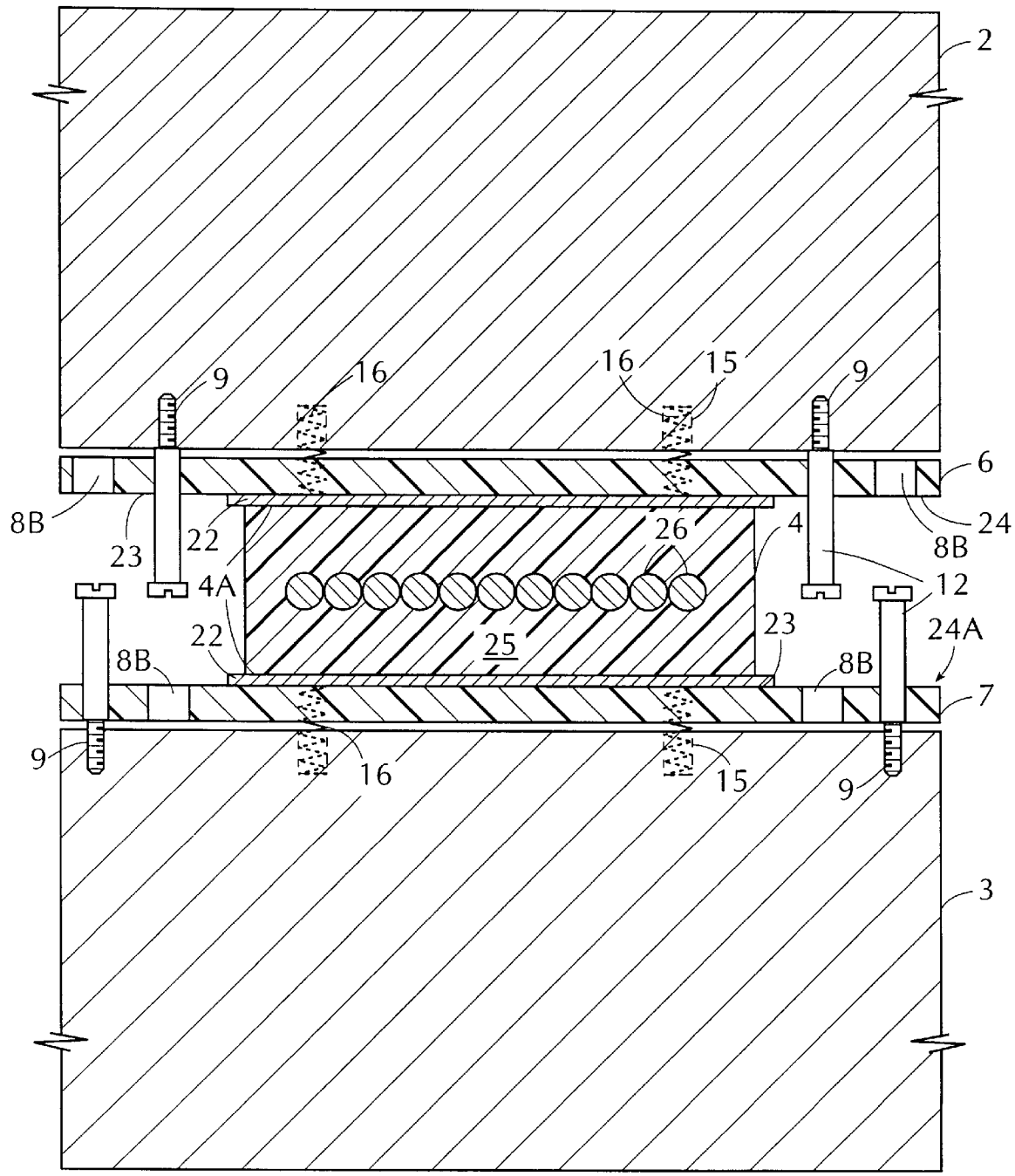
FIG. 5A is a cross-sectional, axial view taken along the line 5—5 of FIG. 2 before the tool has been operated upon the flat longitudinal surfaces of the ribbon.
Figure 5B:
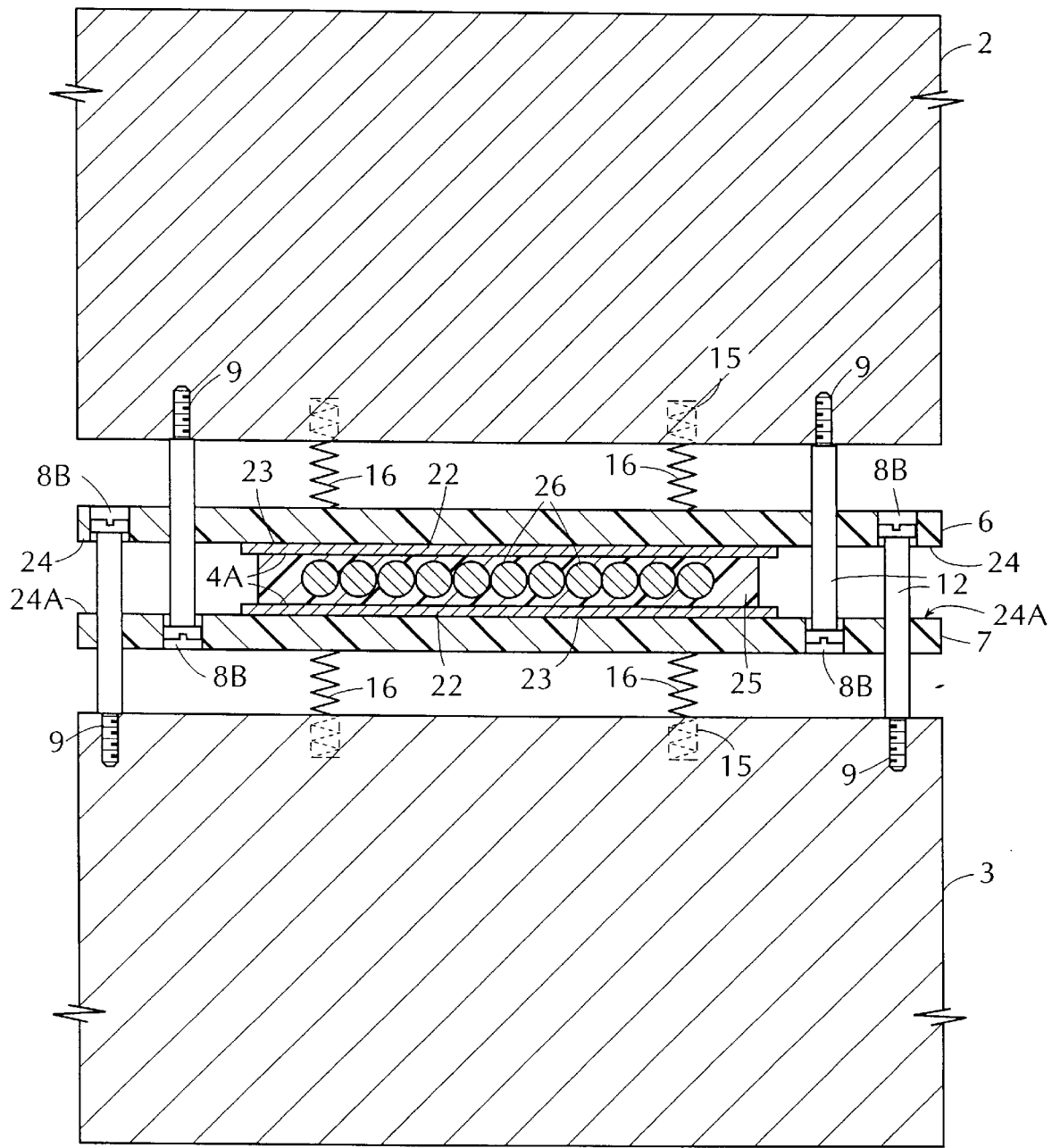
FIG. 5B is a cross-sectional, axial view taken along the line 5—5 of FIG. 2 after the tool has been operated to remove encapsulant on the flat longitudinal surfaces of the ribbon.

In the closed or engaged position of the tool 1, as shown in perspective in FIG. 2, in transverse cross-section in FIG. 4 and in axial cross-section at the recesses 8B and the holes 8A in FIGS. 5A and 5B, the holder 2 or the holder 3 is rotated on the hinge 5 relative to the other holder to cause the edge surfaces 21 of the respective opposing end plates 13 to contact each other and define a channel 30 therein. In the closed position, the surface portions 24 and 24A face each other and are in spaced relation. FIGS. 4 and 5A show the ribbon 4 held in the channel 30 of the tool 1 before the tool 1 is operated on the ribbon 4. FIG. 5B shows the ribbon 4 in the tool 1 after the tool 1 is operated and stress concentrators are formed in the encapsulant and encapsulant is removed from the ribbon 4, as explained below.

In operation, the tool 1 of the present invention is lightweight, compact and simple to use. After the holder 2 is rotated away from the holder 3, in other words, when the tool 1 is in the open position shown in FIG. 1, the ribbon 4 is aligned with the cut outs 19 and a longitudinal portion of the ribbon 4 at which access to the fibers 26 is desired is positioned, preferably at approximately half the distance between the ends 13A and 13B of the tool 1. When the ribbon 4 is aligned lengthwise with the cut outs 19, the ribbon 4 is lowered, maintaining the alignment with the cut outs 19, to cause one of the longitudinal surfaces 4A to contact the abrasive surface of the pad 22 which is attached to the plate 7. At this point, a span of the ribbon 4 for which fiber access is desired is in contact with the abrasive surface of the pad 22.

When the tool 1 is closed, the opposing end plates 13 of the holders 2 and 3 are in contact at their respective opposing edge surfaces 21. The contact between the opposing edge surfaces 21 on the end plates 13 limits the closure of the tool 1. In addition, the ribbon 4 compresses the springs 16, by way of the pads 22, and the springs 16 bias the plates 6 and 7 toward each other and perpendicularly to the planes of the abrasive surfaces of the respective abrasive pad 22 so that the pads 22 are urged toward the surfaces 4A of the ribbon 4. The shoulder screws 12 hold the plates 6 and 7 to the holders 2 and 3, respectively, and the heads of the screws 12 are received in the recesses 8B in the opposing plate.

Thus, when the tool 1 is closed, the springs 16 control the amount of force that acts on the abrasive pad 22, such that the force does not and cannot exceed a predetermined maximum. The springs 16, consequently, control the force with which the pads 22 are applied against the longitudinal surfaces 4A of the ribbon 4.

To begin to operate the tool 1 to provide for separation of the fibers from the encapsulant 25, the tool 1 is held with one hand and the ribbon 4 with the other hand, and the tool 1 is pulled in either of the directions indicated by the arrows A, as shown in FIG. 2. Alternatively, the tool 1 can be held stationary and the ribbon 4 can be moved in either direction. Desirably, the ribbon 4 is maintained taut during relative movement of the tool 1 and the ribbon 4.

As the tool 1 and the ribbon 4 are moved relative to each other, the abrasive wiping action of the abrasive pads 22 against the surfaces 4A randomly imparts scratches in the surfaces 4A of the ribbon 4 encapsulant. These scratches create stress concentrators or discontinuities in the encapsulant 25 of the ribbon 4. The resiliency of the springs 16 ensures that the surfaces 4A are wiped with the abrasive pads 22 under a moderate amount of pressure which is sufficient to abrade, e.g., scratch, the surfaces 4A and create stress concentrators in the encapsulant 25. The scratching of the encapsulant 25, at least at a microscopic level, removes encapsulant to reduce the overall thickness of the ribbon 4 at the midspan portions. The creation of stress concentrators in the encapsulant, without substantial removal of encapsulant, reduces the strength of the encapsulant to a much greater degree than the reduction in strength of the encapsulant which is achieved through the removal of material which is caused by a relative wiping action of the abrasive only once against a span portion of the encapsulant. As substantially more and more encapsulant is removed up to the point that almost all of the encapsulant on the outer peripheries of the fibers facing the abrasive material is removed, the encapsulant matrix will become weaker. However, as the encapsulant becomes substantially removed, the risk increases that the fibers themselves may become abraded.

In preferred embodiments, the grit size for the abrasive pads 22 is selected to ensure (i) that stress concentrators are created in the encapsulant of the ribbon based on a relative wiping action of the abrasive only once against a span portion of the encapsulant, and (ii) that the encapsulant 25 on the surfaces 4A is not scratched so deeply to cause contact between the fibers 26 and the pads 22 and, therefore, damage to the fibers 26. Suitable selection of the grit size for the encapsulated medium undergoing fiber separation to achieve midspan access minimizes the risk of damage to the fibers. In one preferred embodiment, the grit size is 400 and the resilient structural characteristics of the springs 16 provide that a pad applies a pressure of 8–25 p.s.i. to the surface of the ribbon encapsulant which contacts the abrasive material of the tool.

In a preferred embodiment, the ribbon 4 is moved relative to the tool 1 only once against a span portion to cause abrading of the encapsulant which forms stress concentrators therein and, therefore, can provide for fiber separation at the desired span of the encapsulant 25.

In a further preferred embodiment, the tool 1 is operated to provide for back and forth relative movement over the same span portion. As the tool 1 and the ribbon 4 are continuously moved relative to each other, the abrasive wiping action of the abrasive pads 22 against the surfaces 4A removes the encapsulant at the surfaces 4A. It is to be understood that scratches are also randomly imparted on the encapsulant to create stress concentrators during this mode of operation of the tool for each relative movement of the tool 1 and ribbon 4.

The number of times that the ribbon 4 is moved relative to the tool 1 will determine how much encapsulant 25 is removed and the extent that the strength of the encapsulant 25 is reduced and, consequently, the ease with which the encapsulant can be peeled off from the fibers.

As the encapsulant 25 becomes substantially removed, the plates 6 and 7 move closer to each other and along the shaft of the screws 12 which hold the plates 6 and 7, respectively, to the holders 2 and 3. The recesses 8B in the plates 6 and 7, which are aligned with the screws 12 in the opposing plates, receive and accommodate the heads of the screws 12 as the encapsulant 25 is removed. The bottom surfaces of the recesses 8B do not contact the heads of the screws 12, as shown in FIG. 5B. Thus, the screws 12 allow the plates 6 and 7 to move freely toward each other such that the pads 22 are urged toward the ribbon 4.

After substantial removal of the encapsulant 25 at the surfaces 4A of the midspan portion of the ribbon 4 is achieved, which would also include creation of stress concentrators in the remaining encapsulant portions, the fibers 26 can easily be separated from the encapsulant 25. The tool 1 is opened and any layer of the encapsulant 25 on the fibers 26 is easily removed, for example, by, most preferably, moving the ribbon back and forth, i.e., side to side, in its major plane or, alternatively, by slight twisting of the ribbon 4, for example, by hand. The force applied by in plane, side to side movement would create shear stresses between individual fibers and act primarily on the encapsulant matrix to cause fragmentation thereof. As a result, the encapsulant would break apart rather easily and, thus, allow the fibers to be separated from the ribbon encapsulant structure. In addition, the applied force of twisting would allow for easy removal by hand of the remaining encapsulant portions in the ribbon which cover the optical fibers and the sides of the ribbon. The optical fibers are then exposed, as shown in FIG. 7, and one or more of the optical fibers can be cut and the ends thereof can be spliced to other optical fibers. Thus, the reduction in the thickness of the encapsulant 25 in a span portion and the creation of stress concentrators in the remaining encapsulant in that portion provides for access to and permits separation of the fibers 26 of the ribbon 4 by hand with relative ease without damage to coatings on the fibers 26. Selected fibers, such as a fiber 26A, are now easily accessed.

It is to be understood that the fiber 26 can also easily be separated from the encapsulant when the tool is moved against a span portion of the ribbon only once, as the stress concentrators created because of such movement would substantially reduce the strength of the encapsulant 25 to enable it to be broken apart rather easily, as described above.

In an alternative embodiment, the springs 16 can be replaced with any resilient material such as a column of resilient foam or rubber which extends between the plates 6 and 7 and the holes 15.

In still another alternative embodiment, the tool 1 can include pads of resilient material, e.g., foam or rubber, in place of the springs 16 which are attached to the surfaces 10 and 11 of the holders 2 and 3 and extend towards the plates 6 and 7 for biasing the plates 6 and 7 toward each other. Such resilient pads are preferably positioned centrally within the surfaces 10 and 11 and between the screws 12.

Normally, with equal pressure applied to the plates 6 and 7 by the springs 16, or other resilient, pressure supplying devices, and with the same abrasive material on the surfaces of the strips or pads 22, stress concentrators will be formed in the encapsulant on both sides of the ribbon and, also, encapsulant will be removed from both sides of the ribbon in equal amounts. However, since the springs 16, or other resilient devices, will cause the abrasive material on the surfaces of the strips 22 to apply substantially the same pressure, and hence provide for the creation of stress concentrators in the encapsulant and substantial encapsulant removal of the ribbon encapsulant, it is possible to apply biassing force only to one of the plates 6 or 7.

Figure 6:
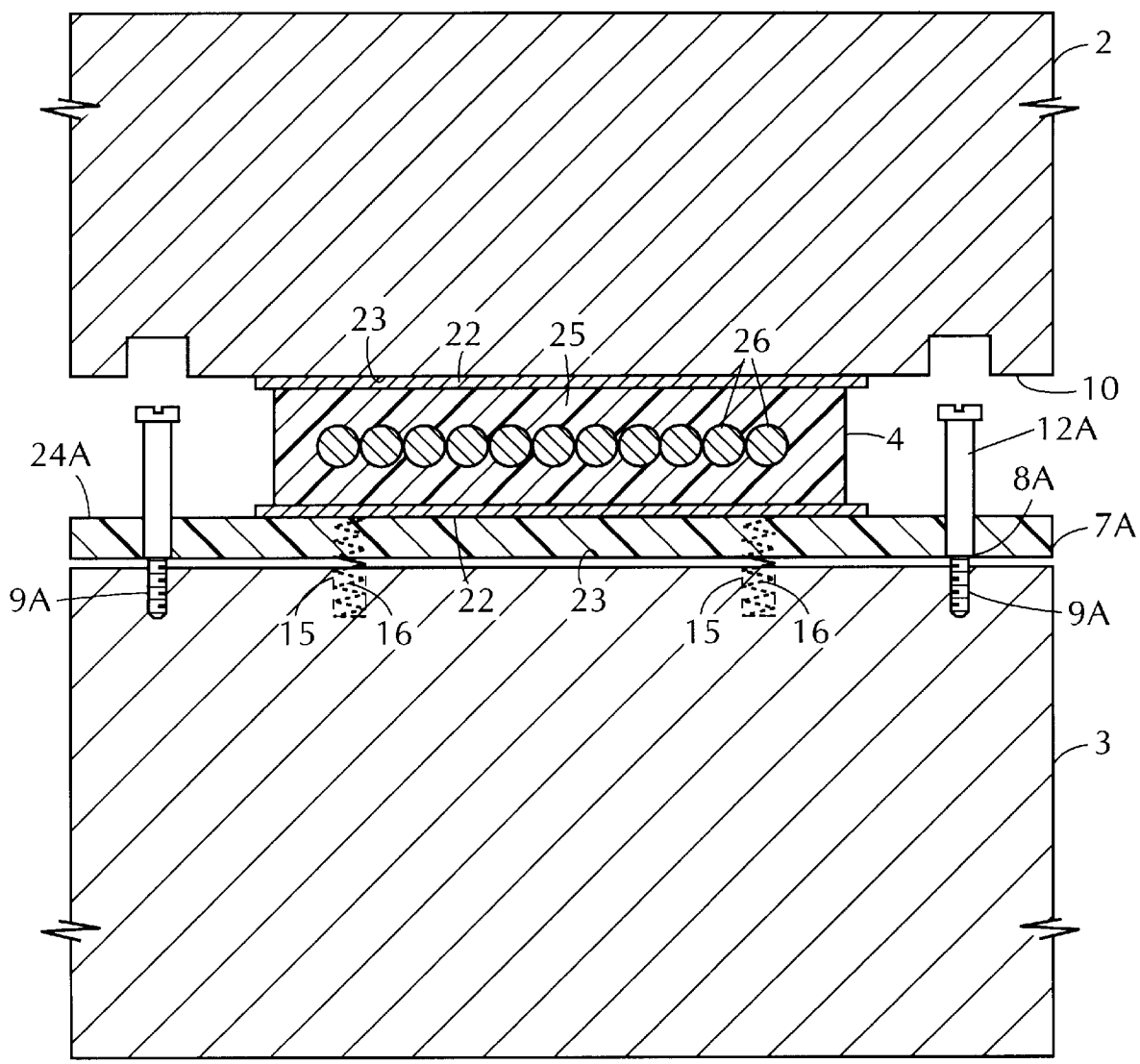
FIG. 6 is a cross-sectional, axial view of another embodiment of a tool for holding and separating encapsulated fibers in a fiber ribbon, according to the present invention, before the tool has been operated upon the flat longitudinal surfaces of the ribbon.

In a further embodiment, the tool 1 can be modified to provide that one of the plates 6 or 7 is fixed in position, or omitted, and has an abrasive pad on its inner surface whereas the other plate is biassed toward the ribbon 4. FIG. 6 shows an axial, cross-sectional view of the tool 1 modified in the above manner with the plate 6 omitted and including the ribbon 4 held therein. For this embodiment of the tool 1, a plate 7A structurally identical to the plate 7, except lacking the recesses 8B, is used in place of the plate 7. Referring to FIG. 6, the holder 2 includes a pad 22 on its inner surface 10. Another pad 22 is attached to the plate 7A, as above, such that the pads 22 are attached in alignment with the cut outs 19, as explained above, to provide that the abrasive pads 22 associated with the respective holders oppose each other when the tool 1 is in the closed position. The holder 3 also is modified to include deeper threaded holes 9A and longer screws 12A because when a ribbon 4 is held within the pads or strips 22, the plate 7A would be at a greater distance from the holder 3.

The embodiment shown in FIG. 6 and, which shows the tool 1 in a closed position is used in a similar manner as the embodiment described in connection with FIGS. 1–5B.

Although not preferred, the pad 22 on the holder 2 can be omitted so that encapsulant is acted upon on only one side of the ribbon 4 when the tool 1 and the ribbon 4 are moved relative to each other as described. In such case, if it is desired to act upon the other side of the ribbon such as to create stress concentrators therein or to remove encapsulant therefrom, the tool 1 is opened and either the tool 1 or the ribbon 4 is rotated by 180° around the ribbon axis, the tool 1 is closed and the relative increment of the tool 1 and the ribbon 4 is related. A minimum separation distance between the abrasive surface of the strips or pads 22 substantially prevents contact between the abrasive pads 22 and the fibers 26 in the ribbon 4, after the encapsulant at the longitudinal surfaces 4A of the ribbon 4 is removed by operation of the tool 1 for exposing or substantially exposing the fibers 26.

Thus, referring to FIG. 5A and 5B the length of the screws 12, the depth of the recesses 8B or a combination of the former and the latter provides that the pads 22 remove encapsulant at the ribbon surfaces 4A only a predetermined depth into the ribbon 4. Referring to FIG. 6 the force of the springs 16 on the plate 7A urging it toward the holder 2 is present only as long as the plate 7A is at a position in which it is not restrained with respect to movement toward the holder 2 by the heads of the screws 12A. Thus, the fibers 26 in the ribbon 4 are protected from damage during midspan access because the amount of and extent that a force is applied to the ribbon 4 and the amount of the encapsulant 25 removed from the surfaces 4A are a function only of the resiliency of the springs 16 and the screw 12A length. As above, the grit size for the abrasive pads 22 is selected to ensure that the encapsulant 25 on the surfaces 4A is not scratched so deeply to cause contact between the fibers 26 and the pads 22 after the plate 7A has moved inward toward the ribbon 4 the maximum extent allowed. Harm to the fibers 26 or fiber coatings, such as coloring (not shown), is avoided because the defined minimum separation distance limits the depth into the ribbon 4 that the abrasive pad 22 can remove encapsulant from the surfaces 4A.

It is to be understood that the tool 1, as illustrated in the embodiment shown in FIGS. 5A and 5B, also can be modified in accordance with the present inventive technique to define a minimum separation distance by decreasing the depth of the recesses 8B in the plates 6 and 7, by increasing the length of the screws 12 or by a combination of the former and the latter.

Figure 8:
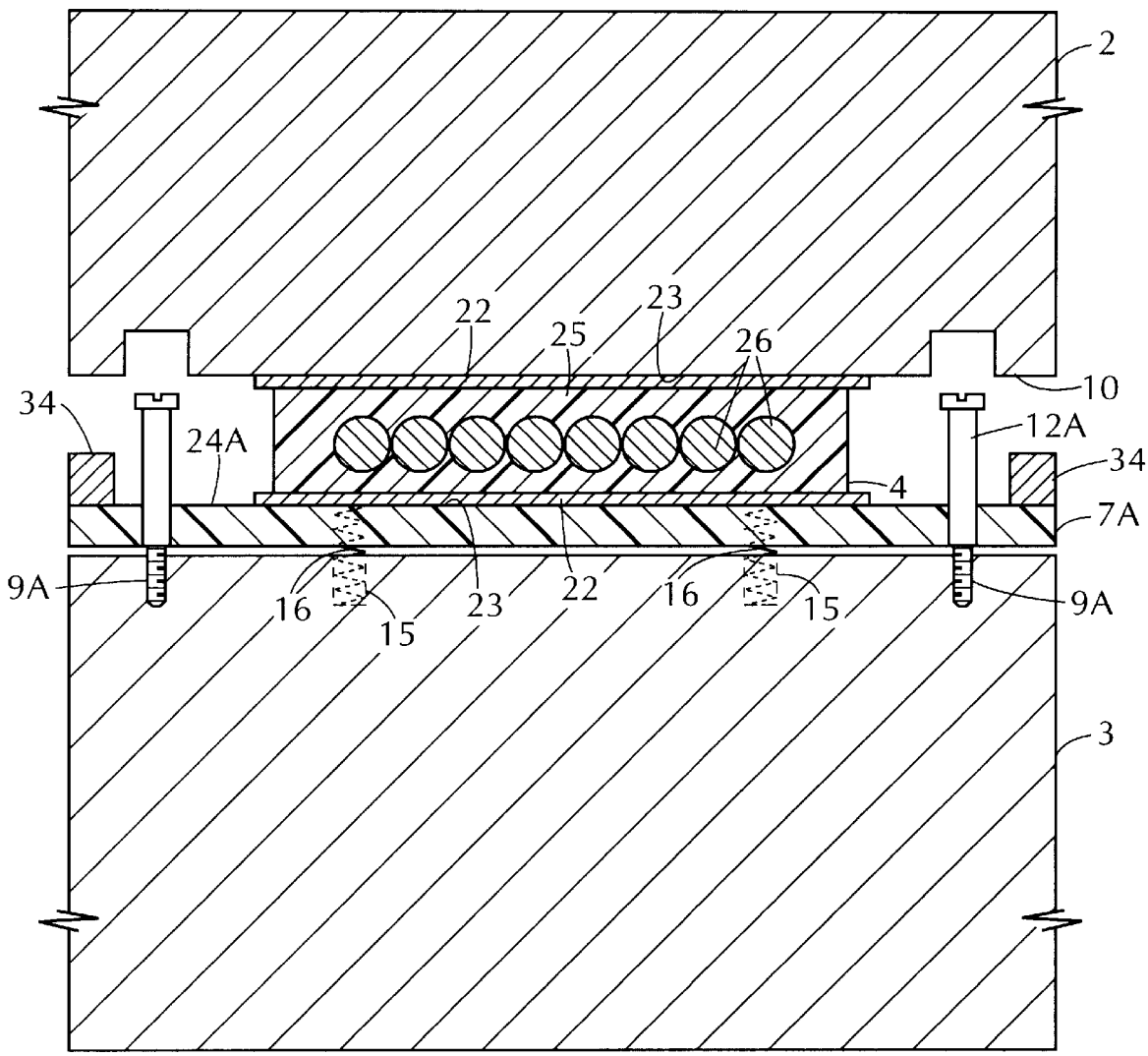
FIG. 8 is a cross-sectional, axial view of a further embodiment of the tool of FIG. 6 including spacing limiting means for defining a minimum separation distance.

In still a further embodiment, the tool 1 as shown in FIG. 6 can be modified for establishing a minimum separation distance between the opposing abrasive materials by including projections 34 which extend away from the inner surface of the plate 7A, as shown in FIG. 8. Preferably, the projections 34 extend lengthwise between the cut outs 19 in the end plates 13, on the lateral edges of the inner surface 24A of the plate 7A, less than the full longitudinal length of the tool 1. Further, the distance from the tops of the projections 34 to the inner surface 24A of the plate 7A is large enough to ensure that the minimum separation distance has the desired operational effect and encapsulant removal can be suitably performed in accordance with the present inventive technique.

Figure 9:
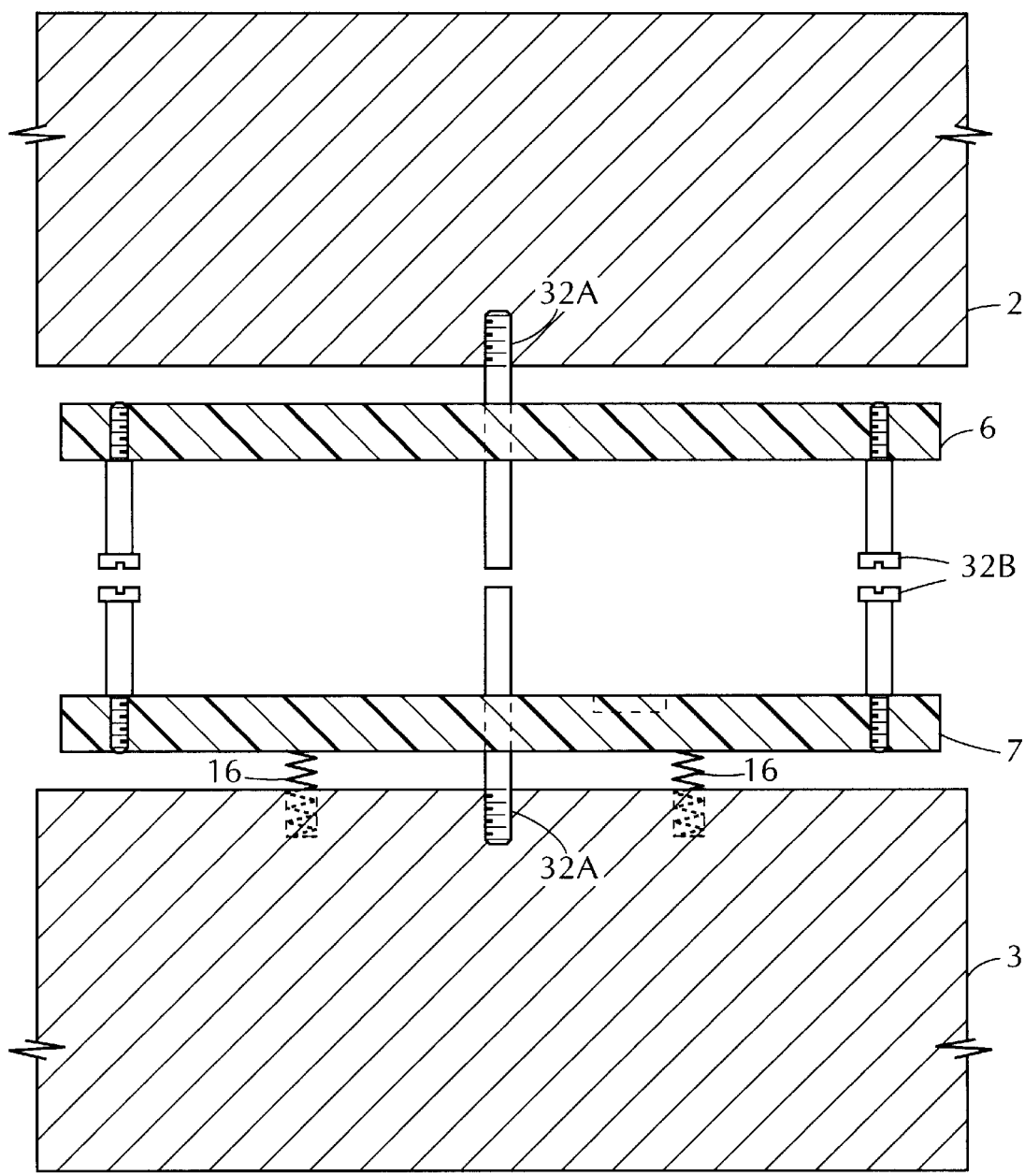
FIG. 9 is a fragmentary, cross-sectional view of a tool for holding and separating encapsulated fibers in a fiber ribbon illustrating alternative spacing limiting means.

FIG. 9 illustrates an alternative spacing limiting means in which the headed screws 12 or 12A are replaced by headless screws 32A which act as guide rods for the plates 6 and 7. Headed screws 32B, which can be headless, are screwed into the plates 6 and 7 and interengage when the plates 6 and 7 reach their minimum spacing.

In a further alternative embodiment, the tool 1 as shown in FIGS. 1–4 and 5A–5B can be modified to include dowels of a predetermined height, which are threaded through holes in at least one of the plates and coupled to a respective holder. The dowels operate to limit movement of the at least one plate toward the opposing holder and, thus, define a minimum separation distance between the opposing abrasive materials.

In another alternative embodiment, the tool 1 as shown in FIGS. 1–4 and 5A–5B can be modified to include holes which are bored into a holder in alignment with the holes 8A in the plate associated with the holder. An adjustable screw can be threaded through these holes in the holder and the holes 8A in the plate so that the adjustable screw protrudes through the plate and toward the opposing plate for defining a minimum separation distance.

I claim:

1. A method for separating an encapsulated optical fiber from the encapsulant at a selected span of the encapsulated optical fiber comprising:

placing the selected span of the encapsulated optical fiber between first and second layers, wherein at least one of said first and second layers includes an abrasive material;

applying a force through resilient means to at least one of the layers for resiliently urging at least one of said layers toward the encapsulant on the encapsulated optical fiber and limiting said force so that it does not exceed a predetermined maximum; and moving the encapsulated optical fiber and the first and second layers relative to each other at the selected span while said one of said layers is urged toward the encapsulant for abrading the encapsulated fiber.

2. The method of claim 1, wherein the moving of the fiber relative to the layers for abrading the encapsulated fiber comprises moving the fiber relative to the layers to create a stress concentrator in the encapsulant.

3. The method of claim 2, wherein the moving the fiber relative to the layers for abrading the encapsulated fiber comprises moving the fiber relative to the layers over the selected span more than at least once to remove substantial portions of the encapsulant from the encapsulated fiber.

4. The method of claim 1 further comprising limiting the movement of the layers toward the encapsulant to prevent contact between the fiber and the abrasive material on the one layer.

5. The method of claim 1, wherein forces are applied to both of said layers thorugh resilient means to resiliently urge both of said layers toward the encapsulant and wherein said forces are limited to values which do not exceed a predetermined maxiumum.

6. The method of claim 5 further comprising limiting the movement of the layers toward the encapsulant to prevent contact between the fiber and the abrasive material on the one layer.

* * * * *